United States Patent
Reichel et al.

(10) Patent No.: US 8,747,518 B2
(45) Date of Patent: Jun. 10, 2014

(54) METHOD FOR FOAMED SLAG GENERATION OF A NON-CORROSIVE MELT IN A CONVERTER

(75) Inventors: Johann Reichel, Düsseldorf (DE); Lutz Rose, Duisburg (DE)

(73) Assignee: SMS Siemag Aktiengesellschaft, Düsseldorf (DE)

( * ) Notice: Subject to any disclaimer, the term of this patent is extended or adjusted under 35 U.S.C. 154(b) by 0 days.

(21) Appl. No.: 13/522,637

(22) PCT Filed: Jan. 5, 2011

(86) PCT No.: PCT/EP2011/050079
§ 371 (c)(1),
(2), (4) Date: Oct. 9, 2012

(87) PCT Pub. No.: WO2011/089027
PCT Pub. Date: Jul. 28, 2011

(65) Prior Publication Data
US 2013/0019714 A1   Jan. 24, 2013

(30) Foreign Application Priority Data
Jan. 19, 2010  (DE) .......................... 10 2010 004 983

(51) Int. Cl.
*C21C 5/28* (2006.01)
(52) U.S. Cl.
USPC .................... 75/375; 75/386; 75/561; 75/569
(58) Field of Classification Search
USPC .................................... 75/375, 386, 561, 569
See application file for complete search history.

(56) References Cited

U.S. PATENT DOCUMENTS

| | | |
|---|---|---|
| 5,395,420 A | 3/1995 | Masucci |
| 5,891,214 A | 4/1999 | Innes et al. |

(Continued)

FOREIGN PATENT DOCUMENTS

| | | |
|---|---|---|
| DE | 19518343 | 11/1996 |
| DE | 102007006529 | 8/2008 |

(Continued)

OTHER PUBLICATIONS

Schmale, K. "Metal 2001." 2001. MS. Ostrava, Czech Republic. Metal 2001. May 15, 2001. Web. May 14, 2013. <http://www.metal2012.com/files/proceedings/metal_01/papers/51.pdf>.*

*Primary Examiner* — George Wyszomierski
*Assistant Examiner* — Tima M McGuthry Banks
(74) *Attorney, Agent, or Firm* — Lucas & Mercanti, LLP; Klaus P. Stoffel

(57) ABSTRACT

In order to carry out foaming of a slag having a high ratio of chromium oxide having values of often above 20% of a non-corrosive melt in an AOD (Argon Oxygen Decarburization) or MRP (Metallurgical Refining Process) converter or CON-ARC SSt for stainless steel by adding a foam material, according to the invention a previously defined mixture (5) of a metal oxide, iron carrier, carbon and binding material in the form of pellets or briquettes (4) is introduced into the converter, which reacts in a chemically reducing manner under the slag layer (2) due to the high ambient temperature, wherein gaseous carbon monoxide formed in particular by means of the reduction process of the metal oxide with the carbon within the pellets or briquettes (4) induces the slag foaming with the gas bubbles (7) thereof and wherein the specific density of the pellets or briquettes (4) and the resolve time of the reduction process are selected so that optimal bubble formation in respect of size and duration is achieved.

4 Claims, 1 Drawing Sheet

(56) References Cited

U.S. PATENT DOCUMENTS

| | | | |
|---|---|---|---|
| 6,228,137 B1 | 5/2001 | Guillot et al. | |
| 8,043,401 B2 * | 10/2011 | Reichel et al. | 75/10.24 |
| 8,043,402 B2 | 10/2011 | Reichel et al. | |
| 2006/0260435 A1 | 11/2006 | Rose et al. | |
| 2011/0197708 A1 | 8/2011 | Reichel et al. | |

FOREIGN PATENT DOCUMENTS

| | | |
|---|---|---|
| DE | 102008032975 A | 1/2010 |
| EP | 0655508 | 5/1995 |
| EP | 0743368 A | 11/1996 |
| JP | 1116018 | 5/1989 |
| JP | 5287348 | 11/1993 |
| JP | 7258715 | 10/1995 |
| JP | 2004300507 | 10/2004 |
| KR | 10200897407 | 4/1994 |
| RU | 2010864 | 4/1994 |
| RU | 2241046 | 11/2004 |
| RU | 2288278 | 11/2006 |
| WO | 0014287 | 3/2000 |
| WO | 0129271 | 4/2001 |
| WO | 2004104232 | 12/2004 |
| WO | 2007087979 | 8/2007 |
| WO | 2008095575 | 8/2008 |

* cited by examiner

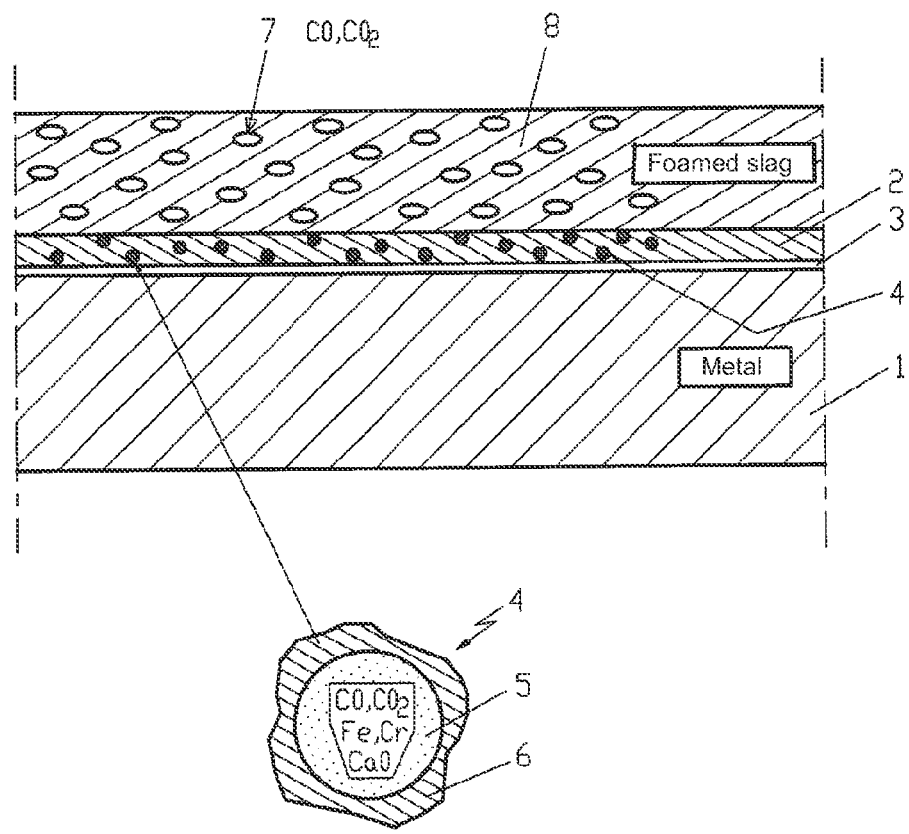

METHOD FOR FOAMED SLAG GENERATION OF A NON-CORROSIVE MELT IN A CONVERTER

The present application is a 371 of International application PCT/EP2011/050079, filed Jan. 5, 2011, which claims priority of DE 10 2010 004 983.2, filed Jan. 19, 2010, the priority of these applications is hereby claimed and these applications are incorporated herein by reference.

BACKGROUND OF THE INVENTION

The invention concerns a method for producing foamed slag on a stainless steel melt in an AOD (argon oxygen decarburization) or MRP (metallurgical refining process) converter or CONARC SSt for stainless steel by adding a foaming material.

During refining in a converter for producing stainless steel, a slag forms which has a high content of metal oxides, especially chromium oxide. The concentration of the chromium oxide during the refining phase often reaches values exceeding 20%, which greatly increases the viscosity of the slag. The slag is usually very hard just before the reduction.

The process metallurgy of these types of slags constitutes the following successively occurring partial reactions:

$\{O_2\}=2[O]$ thermal dissociation of the oxygen (1)

$2[Cr]+3[O]=(Cr_2O_3)$ chromium oxidation in the melt (2)

$(Cr_2O_3)+3[C]=2[Cr]+3\{CO\}$ chromium oxide reduction at the slag/metal phase boundary (3)

Reaction (3) is fundamentally important for the production of stainless steel, because chromium oxide is the most important component in the foamed slag production. However, this reaction takes place to a very limited extent in the conventional process. The reason for this is the high viscosity of the slag. All current converter processes reduce the slag only in the following step, in the so-called reduction, and the process for this is normally carried out with silicon in the form of ferrosilicon.

If, however, the slag viscosity is suitable for foaming, the reduction process (Eq. 3) is made possible by the gaseous CO formed in the refining process itself and by the iron oxide reduction of the foaming material, which is added to the melt in the form of pellets or briquettes at a specific time. The principal components of the material are iron oxide carriers, e.g., scale, then carbon and a ballast material, which defines a systematic placement of the briquette in the melt.

The reduction process in this type of briquette then proceeds by the following principle:

$(Fe_2O_3)+3[C]=2[Fe]+3\{CO\}$ chromium oxidation in the melt (4)

The crucial factors for the formation of the foamed slag are thus the constituents of the added foaming material and the slag viscosity, which in turn depends on the composition and the temperature of the molten slag. Above all the viscosity defines a phase region of the molten slag in which foam formation is possible. Therefore, it is important to control the slag basicity, which is responsible for the viscosity, so that the gas bubbles that are formed are forced to stay temporarily in the slag layer. In this regard, the limestone added to control the slag basicity constitutes a further source of gas, since the thermal dissociation of this material releases CO according to the following equation:

$(CaCO_3)=(CaO)+\{CO\}$ (5)

The phenomenon of bubble formation involves a process that utilizes the mechanical force of the reacting gas bubbles to produce a new surface region in the slag. The buoyant forces on the gas bubbles transiently split the slag surface and saturate the whole slag layer to produce the foam. When there is a protracted gas stream from the reacting substances, the number of accumulating bubbles grows with the growing foam. As a result, the height of the foam layer increases with increasing amount of gas; it is directly proportional to the amount of the foaming material.

An important factor in this type of mechanism is the optimal placement of the reactants to obtain a maximum foaming effect. Optimal placement occurs in the boundary region between the slag layer and the liquid metal.

The document JP 1 116018 A describes a method for increasing the efficiency of the blowing process in steelmaking in a converter by adding a mixture, wherein slag formation and foaming is prevented.

DE 195 18 343 A1 describes a method for increasing the effectiveness of the smelting reduction of oxidic metal carriers and improving the thermal efficiency of the charged fuels in the smelting production process.

DE 10 2008 032975 A1 describes a method for producing a foamed slag on stainless steel melts in an electric arc furnace.

Slag foaming has not been used so far in the production of stainless steel. Nowadays only dusts are added as compressed pellets or briquettes for the purpose of realizing cooling effects. Since the reducing element, namely, carbon, and the ballast material are not present in the briquettes, these remain effective only unreduced in the slag zone.

In DE 10 2007 006 529 A1, in the production of a foamed slag on a high-chromium steel melt, the metal oxides, mainly chromium oxide, that are present in the slag are additionally reduced by the briquettes and/or pellets floating near the melt/slag phase boundary, such that the reaction gases that are produced support the foaming of the slag. To this end, the briquettes or pellets charged to the electric arc furnace consist of a well-defined mixture of an iron carrier as the ballast material, carbon or carbon as the reducing agent, and a binder.

SUMMARY OF THE INVENTION

During blowing in the converter, a slag forms which has a high content of chromium oxide. As mentioned earlier, the chromium oxide concentration often reaches values in excess of 20%, so that slags of this sort cannot be liquefied and foamed to the desired extent due to their composition. The objective of the invention is to develop a method with which the previously known successful methods for slag foaming in the electric arc furnace can also be used in a converter.

The stated objective is achieved in that a previously defined mixture of a metal oxide, iron carrier, carbon, and binding material is introduced into the converter in the form of pellets or briquettes and reacts in a chemically reducing manner under the slag layer due to the high ambient temperature, such that gaseous carbon monoxide, which is formed especially by the process of reducing the metal oxide with the carbon, produces the slag foaming with its gas bubbles, and such that the specific weight of the material and the resolution time of the reducing process are selected in such a way that optimal bubble formation with respect to size and duration is achieved.

Foamed slag develops quasi-exponentially according to the composition of the well-defined mixture that consists of a metal oxide, iron carrier, carbon, and binding material in the form of pellets or briquettes. Introduced into the zone between the slag layer and the metal melt, the mixture is subjected, due to the prevailing high ambient temperature, to a dissolving process with parallel reduction of the iron oxide. Immediately upon their entrance into this zone, the pellets or briquettes become encased with a shell of solidified metal due to their colder temperature. Since the mean melting point of the pellets or briquettes is lower than that of the metal, the mixture inside the shell undergoes a melting process. Depending on the temperature difference, the reduction process inside the shell ends either earlier or later than the melting of the shell. In the former case, the process can lead to the bursting of the granules and explosive release of the CO gas bubble, which results in more thorough mixing of metal and slag. In the latter case, the CO gas bubble develops freely in the zone between the slag and the metal melt.

In accordance with the invention, the addition of the foaming material is carried out in such a way, by specific control with values of 2-30 kg of pellets or briquettes/t of liquid metal/min, that a well-defined foamed slag height is obtained and then maintained for a predetermined period of time. The charging of the foaming material is distributed in layers and in such a way that the entire area is covered with a well-defined weight per unit area that amounts to 1-5 kg/m$^2$/min for an optimal foaming effect.

An important consideration for systematic slag foaming is the maintenance of a well-defined slag viscosity, so that a suitable slag control system is necessary.

The operation of converters involves blowing a charge, i.e., especially the feed metal, with oxygen. In this operation, the slag performs its primary function by capturing undesired components from the melt. Due to the low thermal conductivity of the foamed slag, the heat losses are greatly reduced, and thus the energy input into the metal melt is improved.

The foamed slag also means strong sound absorption. The top blowing lance enveloped in foamed slag emits little noise into the environment, and this means improved environmental conditions in the vicinity of the converter.

Other advantages of a strongly foaming slag in the converter are:
improved energy balance of the melt due to the layer of insulation provided by the foamed slag,
acceleration of decarburization by saturated oxygen in the slag and its reaction with dispersive metal drops,
minimization of splattering and clogging of the interior of the converter,
increase in the process efficiency by metal recovery from residual materials, such as arc furnace and converter dusts, sludges, and other recyclable residual materials of the steelworks, which can be mixed into the pellets or briquettes as metal oxide or iron carriers,
cooling effect of the briquette additions.

BRIEF DESCRIPTION OF THE DRAWINGS

The single FIGURE is a schematic representation of a slag layer on a metal melt.

DETAILED DESCRIPTION OF THE INVENTION

A slag foaming method in accordance with the invention will now be described with reference to the accompanying schematic drawing. A slag layer 2 with pellets 4 embedded in it floats on a metal melt 1 in a converter (not shown). These pellets 4 were previously introduced into the converter, in which they initially became arranged in the zone 3 between the slag layer 2 and the metal melt 1 due to their preadjusted density and their formation with a shell 6 of solidified metal. After this shell 6 melts, making the pellets 4 lighter, some of the pellets 4 leave the zone 3 and are located inside the slag layer 2. The $CO/CO_2$ gas bubbles 7 produced by the reduction of iron oxide carriers present in the pellets 4 and of limestone ($CaCO_3$) that is present have led to the formation of a foamed slag layer 8, in which the $CO/CO_2$ bubbles 7 are shown enlarged.

A pellet 4 is also shown enlarged. It consists in the present example of the constituents CO, $CO_2$, Fe, Cr, and CaO and is encased in a shell 6 of solidified metal that formed in zone 3.

LIST OF REFERENCE NUMBERS

1 metal melt
2 layer of slag
3 zone between the slag layer and the metal melt
4 pellet
5 defined mixture of the pellet
6 shell of solidified metal formed on the pellet
7 gas bubble
8 layer of foamed slag

The invention claimed is:

1. A method for producing foamed slag on a stainless steel melt in an AOD (argon oxygen decarburization) or MRP (metallurgical refining process) converter for stainless steel by adding a foaming material, wherein a mixture (5) of a metal oxide, iron carrier, carbon, and binding material is introduced into the converter as pellets or briquettes (4) and reacts in a chemically reducing manner under a slag layer (2) due to a high ambient temperature, wherein gaseous carbon monoxide, which is formed by a process of reducing the metal oxide with the carbon inside the pellets or briquettes (4), produces the slag foaming with its gas bubbles (7), wherein the addition of the foaming material is carried out in such a way, by specific control with values of 2-30 kg of pellets or briquettes (4) per metric ton of metal melt (1) per minute, that a well-defined foamed slag height is obtained and then maintained for a predetermined period of time, and that the charging of the foaming material is distributed in layers and in such a way that the entire area is covered with a well-defined weight per unit area that amounts to 1-5 kg/m$^2$/min for an optimal foaming effect.

2. A method in accordance with claim 1, wherein to maintain a well-defined slag viscosity, which is necessary for systematic slag foaming, a slag control system is used.

3. A method in accordance with claim 1 wherein available residual materials are used in the mixture (5) of the pellets or briquettes as metal oxide or iron carriers.

4. A method in accordance with claim 3, wherein the available residual materials include at least one of furnace dust, converter dust and sludge.

* * * * *